March 10, 1925.  
W. P. HENDRICKSON  
AUTOMOBILE SIGNAL  
Filed Aug. 26, 1924
1,529,307
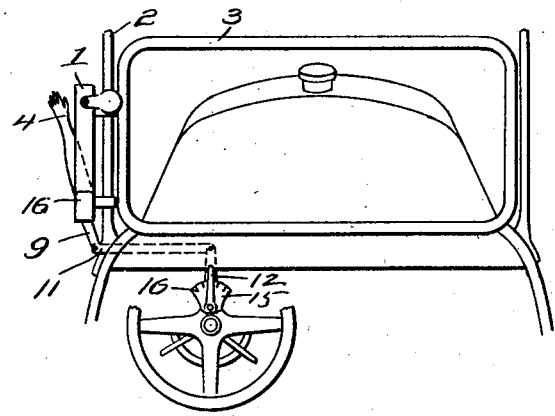
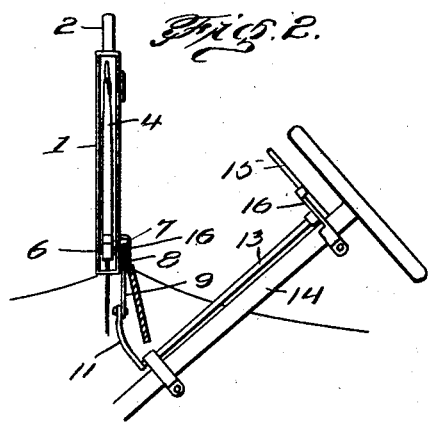
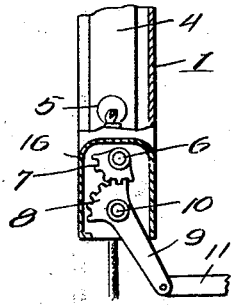
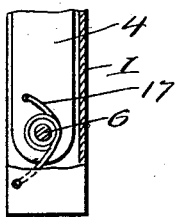
Inventor  
Wren P. Hendrickson.
By *Clarence A. O'Brien*  
Attorney Patented Mar. 10, 1925.

1,529,307

UNITED STATES PATENT OFFICE.

WREN P. HENDRICKSON, OF OJAI, CALIFORNIA.

AUTOMOBILE SIGNAL.

Application filed August 26, 1924. Serial No. 734,252.

*To all whom it may concern:*

Be it known that I, WREN P. HENDRICKSON, a citizen of the United States, residing at Ojai, in the county of Ventura and State of California, have invented certain new and useful Improvements in an Automobile Signal, of which the following is a specification.

This invention relates to automobile signals and it consists in the novel features hereinafter described and claimed.

An object of the invention is to provide a signal including a casing adapted to be attached to the frame of the windshield of an automobile machine and having an arm pivotally mounted therein. The structure also includes means which are mounted upon the steering post of the machine and which are operatively connected with the said arm and which may be manually manipulated in order to swing the arm to cause the same to protrude beyond the side of the machine when the driver is about to make a turn thus giving a signal that the machine is about to change its course of travel.

In the accompanying drawing:—

Figure 1 is a rear elevational view of the wind shield of an automobile machine showing the signal applied to the frame thereof.

Figure 2 is a side elevational view of the signal.

Figure 3 is a detailed fragmentary view of the casing of the signal with parts thereof broken away and parts shown in section.

Figure 4 is a detailed fragmentary view, in section, of the casing, taken vertically through the lower portion thereof, showing the return spring associated with the signal arm.

The signal comprises a casing 1 which is adapted to be connected with the frame 2 of an automobile machine and adjacent the wind shield 3 thereof. The casing 1 is open at its other side and a hand and arm 4 is pivoted at the lower portion of the casing 1 and between the front and rear sides thereof. An electric bulb 5 is carried at the lower or inner portion of the arm 4. The arm 4 is mounted upon the shaft 6 which is journaled in the side walls of the casing 1 and the shaft 6 carried at its rear end and at a point beyond the rear side of the casing 1 with a gear segment 7. The teeth of the gear segment 7 mesh with the teeth of a gear segment 8 which is mounted upon the lever 9 pivoted to the casing 1 as at 10. A link rod 11 is pivotally connected at its outer end with the lower end of the lever 9 and pivotally connected at its inner end with an arm 12 which is mounted at the lower end of a shaft 13 journaled at the side of the steering post 14 of the automobile machine. Arm 15 is carried at the upper end of the shaft 13 and is arranged over the graduated plate 16 which is fixed with relation to the steering post 14.

By reason of this arrangement it will be observed that when the driver of the machine swings the arm 15, the shaft 13 is turned and the arm 12 is correspondingly swung whereby the link rod 11 is moved longitudinally and the lever 9 is swung upon its fulcrum point whereby the segment 8 turns the segment 7 and the shaft 6. As the shaft 6 is turned the arm 4 is swung from a position between the opposite side walls of the casing to a position approximately at a right angle with relation to the vertical height of the said casing and thus the said arm is displayed or protruded at the side of the automobile machine and indicates that the driver thereof is about to change his course of travel. When the arm 4 swings to a horizontal position the bulb 5 is illuminated by means (not shown). A hood 16 is disposed over the gears 7 and 8 and a return spring 17 is connected with the arm 4 and casing 1 as shown in Figure 4.

Having thus described the invention, what I claim is:—

1. An automobile signal comprising a casing which is open at its side, means for attaching the casing to the frame of the automobile, an arm pivoted in the casing, a shaft journaled in the casing and carrying the arm, a lever pivoted upon the casing, intermeshing gears outside the casing connecting the lever with the shaft and means for manually swinging the lever.

2. An automobile signal comprising a casing which is open at its side, means for attaching the casing to an automobile, an arm normally housed within the casing, a hood on the casing, a shaft journaled in the casing and terminating in the hood and carrying the arm within the casing, a lever fulcrumed on the casing within the hood, intermeshing gear segments disposed within the hood connecting the lever with the shaft, and means for manually swinging the lever.

3. An automobile signal comprising a casing open at its side, means for attaching the casing to an automobile, an arm normally housed within the casing, a strand of spring material looped intermediate its ends and having one end attached to the arm and the other end to the casing, a shaft journaled in the casing passing through the coil and terminating exteriorly of the casing, a hood on the casing housing the exterior end of the shaft, a lever fulcrumed on the casing within the hood, said arm carried by the shaft, intermeshing gear segments connecting the lever with the shaft and disposed in the hood, and means for manually swinging the lever so as to move the arm out of the casing, said strand of spring material adapted to return the arm into the casing.

In testimony whereof I affix my signature.

WREN P. HENDRICKSON.